(12) United States Patent
Li et al.

(10) Patent No.: US 11,300,478 B2
(45) Date of Patent: Apr. 12, 2022

(54) BALANCE FOR AIR RESISTANCE TESTING

(71) Applicant: BEIHANG UNIVERSITY, Beijing (CN)

(72) Inventors: Xiaodong Li, Beijing (CN); Yin Liu, Beijing (CN); Mingyang Zheng, Beijing (CN); Chao Chen, Beijing (CN); Junhui Gao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 188 days.

(21) Appl. No.: 16/837,606

(22) Filed: Apr. 1, 2020

(65) Prior Publication Data
US 2020/0284688 A1 Sep. 10, 2020

Related U.S. Application Data

(63) Continuation of application No. PCT/CN2018/087701, filed on May 21, 2018.

(30) Foreign Application Priority Data

May 2, 2018 (CN) .......................... 201810408055.4

(51) Int. Cl.
G01L 9/00 (2006.01)
G01M 9/06 (2006.01)
G01L 1/22 (2006.01)
G01N 19/02 (2006.01)

(52) U.S. Cl.
CPC ............... *G01M 9/062* (2013.01); *G01L 1/22* (2013.01); *G01N 19/02* (2013.01)

(58) Field of Classification Search
CPC ........... G01M 9/062; G01L 1/22; G01N 19/02
See application file for complete search history.

(56) References Cited

U.S. PATENT DOCUMENTS

| 6,418,776 | B1 * | 7/2002 | Gitis | G01N 3/56 |
| | | | | 73/10 |
| 6,470,759 | B1 * | 10/2002 | Scott | G01G 3/1412 |
| | | | | 73/795 |
| 9,441,941 | B2 * | 9/2016 | Hwang | G01L 5/0057 |
| 2011/0277562 | A1 * | 11/2011 | Berme | G01L 5/1627 |
| | | | | 73/862.639 |
| 2013/0326863 | A1 * | 12/2013 | Menassa | H05K 1/0268 |
| | | | | 29/621.1 |

FOREIGN PATENT DOCUMENTS

| CN | 2247331 Y | 2/1997 |
| CN | 1277352 A | 12/2000 |
| CN | 1456871 A | 11/2003 |

(Continued)

*Primary Examiner* — Max H Noori
(74) *Attorney, Agent, or Firm* — IPro, PLLC

(57) ABSTRACT

A balance for air resistance testing is provided. The air resistance testing comprises 2N dual-hole beam sensors and an upper plate; wherein, the 2N dual-hole beam sensors are arranged beneath the upper plate and fixed to the upper plate; each dual-hole beam sensor comprises a beam, an upper hole and a lower hole, the upper hole and the lower hole are arranged along the longitudinal direction of the beam, the upper hole is arranged at the upper part of the beam, and the lower hole is arranged at the lower part of the beam.

8 Claims, 2 Drawing Sheets

(56) References Cited

FOREIGN PATENT DOCUMENTS

| | | | |
|---|---|---|---|
| CN | 2586137 | Y | 11/2003 |
| CN | 2828774 | Y | 10/2006 |
| CN | 101608960 | A | 12/2009 |
| CN | 105043465 | A | 11/2015 |
| CN | 105783760 | A | 7/2016 |
| CN | 205449351 | U | 8/2016 |
| CN | 205898414 | U | 1/2017 |
| CN | 205909910 | U | 1/2017 |
| CN | 107144330 | A | 9/2017 |
| CN | 107314835 | A | 11/2017 |
| CN | 108593058 | B | 10/2019 |
| JP | S61139728 | A | 6/1986 |
| RU | 178060 | U1 | 3/2018 |

\* cited by examiner

BALANCE FOR AIR RESISTANCE TESTING

CROSS-REFERENCE TO RELATED APPLICATION

The present disclosure claims the benefit of Chinese Patent Application No. 201810408055.4 filed on May 2, 2018, the contents of which are hereby incorporated by reference.

TECHNICAL FIELD

The present disclosure relates to a measuring device and is more particularly concerned with a balance for air resistance testing.

BACKGROUND

In the devices for measuring a frictional force of a flat plate, a test piece is generally such arranged in a wind tunnel with flowing airflow that the test piece is flush with the pipe of the wind tunnel, and a strain gauge is used to measure the strain of the test piece so as to measure the frictional force on the surface of the test piece. Resistance balances are usually the type of single-bearing strain resistance balances as shown in FIG. 1. However, this type of balances also measures the differential pressure force and its moment while measuring the surface frictional force of the test piece. The differential pressure force is uneven in z direction, and, therefore, the arm of the force varies along the whole z direction. Meanwhile, there also exists moment generated by the force along the z direction. So many types of the force make the force measurement more difficult, especially when the existence of the unclear pressure difference and the moment in the z direction. The expression of the force loading on a single-bearing balance is as follows:

$$F_M L = F_\tau L - \Delta p_0 \frac{\pi D^2}{4} X_0 + \frac{1}{64}\frac{dp}{dx}\pi D^2 - \frac{1}{2}LD\int_0^1\int_0^{2\pi} p(\theta, z)\cos\theta d\theta dz$$

SUMMARY

To solve at least one of the technical problems mentioned above and measure the resistance in flow direction, this disclosure designs a force-testing sensor of a dual-hole beam type. The structure characteristics of the dual-hole beam can be used to eliminate the moment in the z direction and the measurement uncertainty due to the uncertainty of the arm of the differential pressure force, such that the sensor only measures the force in the flow direction and the precision of the balance is increased. The balance for air resistance testing in this disclosure is implemented via the technical solutions below.

On one hand, this disclosure provides a balance for air resistance testing, compromising 2N dual-hole beam sensors and an upper plate, wherein, N is a positive integer;

the 2N dual-hole beam sensors are arranged beneath the upper plate and fixed to the upper plate;

each said dual-hole beam sensor comprises a beam, an upper hole and a lower hole, wherein the upper hole and the lower hole are arranged along the longitudinal direction of the beam, the upper hole is arranged at the upper part of the beam, and the lower hole is arranged at the lower part of the beam.

According to at least an embodiment of this disclosure, the dual-hole beam sensor further comprises a first strain gauge, a second strain gauge, a third strain gauge, and a fourth strain gauge, wherein the first strain gauge and the third strain gauge are arranged on the outer side of the lower part of the beam, and the first strain gauge and the third strain gauge are arranged symmetrically with respect to the lower hole; the second strain gauge and the fourth strain gauge are arranged on the outer side of the upper part of the beam, and the second strain gauge and the fourth gauge are arranged symmetrically with respect to the upper hole.

According to at least an embodiment of this disclosure, the beam has a cuboid shape.

According to at least an embodiment of this disclosure, the upper hole and the lower hole are both circular holes.

According to at least an embodiment of this disclosure, the upper end of the beam is fixed to the upper plate.

According to at least an embodiment of this disclosure, the 2N dual-hole beam sensors are distributed rectangularly beneath the upper plate.

According to at least an embodiment of this disclosure, the upper plate is a rectangular plate, and the 2N dual-hole beam sensors are arranged respectively at the positions adjacent to the four angles of the rectangular plate.

According to at least an embodiment of this disclosure, a lower plate for fixing the lower part of the beam of the 2N dual-hole beam sensors is also included.

According to at least an embodiment of this disclosure, the upper hole and the lower hole of each said dual-hole beam sensor are connected through along the longitudinal direction of the beam.

On the other hand, this disclosure provides a method for measuring the frictional force on the upper surface of the upper plate by using the above-mentioned balance for air resistance testing, the method including the following steps, 1) analyzing original forces acting on the upper plate, wherein the original forces acting on the upper plate are a tangential frictional force $F_\tau$, a differential pressure force $F(z)_{\Delta p}$ with unknown force arm, and a force in the z direction $F_p$;

2) simplifying the original forces acting on the upper plate in the Step 1), wherein the resultant force acting on the upper plate in the flow direction is translated to the bottom of the upper plate, such that the original forces are simplified as: a force F formed by the resultant force acting on the upper plate in the flow direction after being translated to the bottom of the upper plate, a moment M caused by the translation of the force, and a gravity G in the z direction;

3) for each said dual-hole beam sensor, the reading strain is $\varepsilon_d = \varepsilon_1 - \varepsilon_2 - \varepsilon_3 + \varepsilon_4$, wherein $\varepsilon_1 \sim \varepsilon_4$ are the values of the strains of the first strain gauge, the second strain gauge, the third strain gauge, and the fourth strain gauge respectively, and the values of the strains of the first strain gauge, the second strain gauge, the third strain gauge, and the fourth strain gauge are:

$$\varepsilon_1 = \frac{FL_2 + M}{EW} - \varepsilon_G$$

$$\varepsilon_2 = \frac{FL_1 + M}{EW} - \varepsilon_G$$

$$\varepsilon_3 = -\frac{FL_2 + M}{EW} - \varepsilon_G$$

$$\varepsilon_4 = -\frac{FL_1 + M}{EW} - \varepsilon_G$$

wherein E is the Young modulus of the dual-hole beam, W is the section modulus in bending of the dual-hole beam, $\varepsilon_G$ is the strain generated by the gravity G at the strain gauges, $L_1$ is the distance from the bottom of the upper plate to the center of the upper hole of the dual-hole beam, and $L_2$ is the distance from the bottom of the upper plate to the center of the lower hole of the dual-hole beam;

4) the reading strain of each said dual-hole beam sensor is $$\varepsilon_d = 2\frac{F(L_2 - L_1)}{EW},$$

and the frictional force F acting on the upper surface of the upper plate is obtained according to the reading strain $\varepsilon_d$.

"The first", "the second", "the third" and "the fourth" in above-mentioned technical solutions are merely for identification and are not used for restricting the structure of related parts.

BRIEF DESCRIPTION OF FIGURES

The accompanying drawings show the exemplary embodiments of the present disclosure and serve to explain the principles of this disclosure along with the description thereof, wherein these accompanying drawings provide further understanding of this disclosure and are included in this specification and constitute part of the specification.

DETAILED DESCRIPTION

Figure 1:
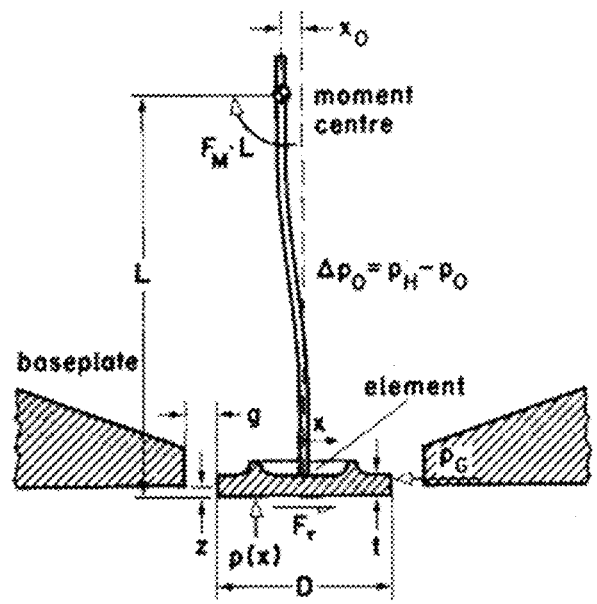
FIG. 1 is a schematic view of the force analysis for a single-bearing balance in the prior art.

The disclosure is further described in detail below with reference to the accompanying drawings and embodiments. It can be understood that the specific embodiments described herein are only used to explain related content, rather than limiting the disclosure. It should also be noted that, only the parts related to the present disclosure are shown in the drawings for the convenience of description.

It should be noted that the embodiments in the present disclosure and the features in the embodiments can be combined with each other without conflict. The disclosure will be described in detail below with reference to the drawings and embodiments.

Figure 2:
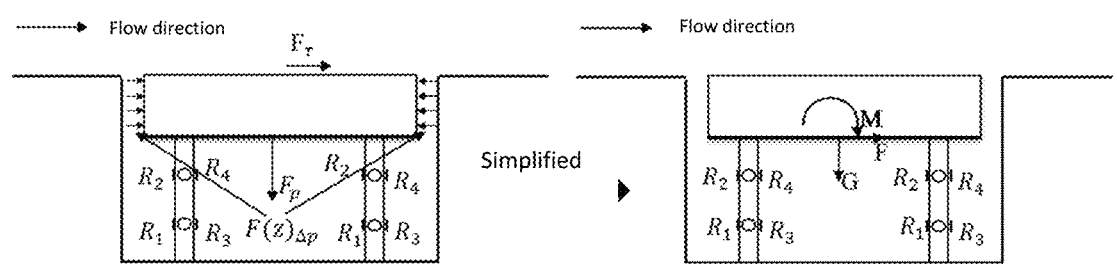
FIG. 2 is a simplified schematic view of the forces acting on the balance for air resistance testing according to at least an embodiment of this disclosure.
Figure 3:
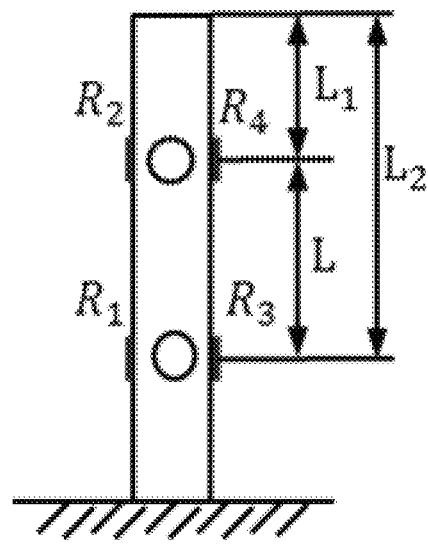
FIG. 3 is a schematic structural view of the dual-hole beam sensor of the balance for air resistance testing according to at least an embodiment of this disclosure.
Figure 4:
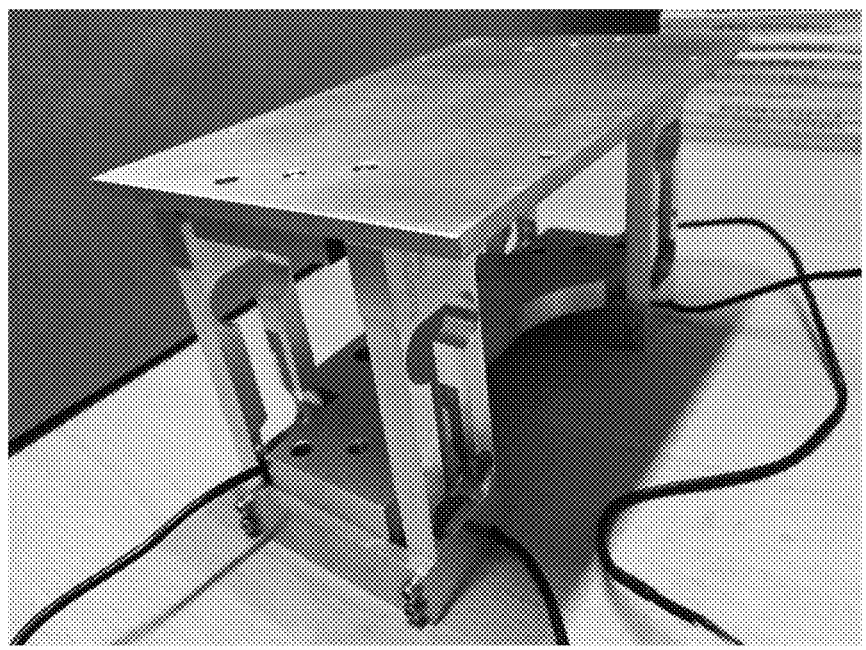
FIG. 4 is a schematic view of the overall structure of the balance for air resistance testing according to at least an embodiment of this disclosure.

As shown in FIG. 2-4, a balance for air resistance testing comprises 4 dual-hole beam sensors (the number of the sensors is preferably 2, 4, or 6) and an upper plate; wherein, the 4 dual-hole beam sensors are arranged beneath the upper plate and fixed to the upper plate; each said dual-hole beam sensor comprises a beam, an upper hole and a lower hole, wherein the upper hole and the lower hole are arranged along the longitudinal direction of the beam, the upper hole is arranged at the upper part of the beam, and the lower hole is arranged at the lower part of the beam. The dual-hole beam sensor comprises a first strain gauge, a second strain gauge, a third strain gauge and a fourth strain gauge, wherein the first strain gauge and the third strain gauge are arranged on the outer side of the lower part of the beam, and the first strain gauge and the third strain gauge are arranged symmetrically with respect to the lower hole; the second strain gauge and the fourth strain gauge are arranged on the outer side of the upper part of the beam, and the second strain gauge and the fourth gauge are arranged symmetrically with respect to the upper hole. The beam has a cuboid shape. The upper hole and the lower hole are both circular holes. The upper end of the beam is fixed to the upper plate. The 4 dual-hole beam sensors are distributed rectangularly beneath the upper plate. The upper plate is a rectangular plate and the 4 dual-hole beam sensors are arranged respectively at the positions adjacent to the four angles of the rectangular plate. The balance for air resistance testing further comprises a lower plate for fixing the lower part of the beam of the 4 dual-hole beam sensors. The upper hole and the lower hole of each said dual-hole beam sensor are connected through along the longitudinal direction of the beam.

A method for measuring the frictional force on the upper surface of the upper plate by using the balance for air resistance testing according to this embodiment comprises the following steps, 1) analyzing original forces acting on the upper plate, wherein the original forces acting on the upper plate are a tangential frictional force $F_\tau$, a differential pressure force $F(z)_{\Delta p}$ with unknown force arm and a force in the z direction $F_p$;

2) simplifying the original forces acting on the upper plate in the Step 1), wherein the resultant force acting on the upper plate in the flow direction is translated to the bottom of the upper plate, such that the original forces are simplified as: a force F formed by the resultant force acting on the upper plate in the flow direction after being translated to the bottom of the upper plat, a moment M caused by the translation of the force, and a gravity G in the z direction;

3) for each said dual-hole beam sensor, the reading strain is $\varepsilon_d = \varepsilon_1 - \varepsilon_2 - \varepsilon_3 + \varepsilon_4$, wherein $\varepsilon_1 \sim \varepsilon_4$ are the values of the strains of the first strain gauge, the second strain gauge, the third strain gauge and the fourth strain gauge respectively, and the values of the strains of the first strain gauge, the second strain gauge, the third strain gauge and the fourth strain gauge are:

$$\varepsilon_1 = \frac{FL_2 + M}{EW} - \varepsilon_G$$

$$\varepsilon_2 = \frac{FL_1 + M}{EW} - \varepsilon_G$$

$$\varepsilon_3 = -\frac{FL_2 + M}{EW} - \varepsilon_G$$

$$\varepsilon_4 = -\frac{FL_1 + M}{EW} - \varepsilon_G$$

wherein E is the Young modulus of the dual-hole beam, W is the section modulus in bending of the dual-hole beam, $\varepsilon_G$ is the strain generated by the gravity G at the strain gauges, $L_1$ is the distance of the bottom of the upper plate to the center of the upper hole of the dual-hole beam, and $L_2$ is the distance from the bottom of the upper plate to the center of the lower hole of the dual-hole beam;

4) the reading strain of each said dual-hole beam sensor is $$\varepsilon_d = 2\frac{F(L_2 - L_1)}{EW},$$

and the frictional force F acting on the upper surface of the upper plate is obtained according to the reading strain $\varepsilon_d$.

In more detail, the working principle of the balance for air resistance testing of the present disclosure is described below.

As shown in FIG. 2, the original forces acting on the test piece (i.e. the upper plate) are a tangential frictional force $F_\tau$, a differential pressure force $F(z)_{\Delta p}$ with unknown force arm, and a force $F_p$ in the z direction. The forces are simplified as: a force F in the horizontal direction, a gravity G in the z direction and a moment M. Thus, for a single dual-hole beam sensor, the reading strain thereof is $$\varepsilon_d = \frac{4U_o}{U_{AC}K} = \varepsilon_1 - \varepsilon_2 - \varepsilon_3 + \varepsilon_4$$

wherein $U_o$ is the voltage measured by the sensor, $U_{AC}$ is the sensor supply voltage, K is the sensitivity coefficient of the strain gauges, $\varepsilon_1 \sim \varepsilon_4$ are the values of the strains acting on strain gauges R1~R4 respectively, and $\varepsilon_d$ is called reading strain, i.e. the digit displayed on the strain gauges. The strains generated by the forces and moment acting on each strain gauge are $$\varepsilon_1 = \frac{FL_2 + M}{EW} - \varepsilon_G$$

$$\varepsilon_2 = \frac{FL_1 + M}{EW} - \varepsilon_G$$

$$\varepsilon_3 = -\frac{FL_2 + M}{EW} - \varepsilon_G$$

$$\varepsilon_4 = -\frac{FL_1 + M}{EW} - \varepsilon_G$$

wherein F is the value of the force formed by the resultant force acting on the test piece in the flow direction after being translated to the bottom of the test piece, M is the moment caused by translation of the force, E and W are Young modulus and the section modulus in bending of the dual-hole beam respectively, $\varepsilon_G$ is the strain generated by the gravity G at the strain gauges, $L_1$ and $L_2$ are the distances from the bottom of the test piece to the minimum sections (i.e. the centers of the upper hole and the lower hole) of the dual-hole elastic beam respectively. Further, the reading strain is $$\varepsilon_d = 2\frac{F(L_2 - L_1)}{EW}$$

Thus, the strain obtained is only generated by the force in the flow direction, which eliminates the gravity G and the moment M and leaves only the force F in the flow direction to be measured. Therefore, it is not necessary to consider the force G in the z direction and that the force arm of the differential pressure force $F(z)_{\Delta p}$ is unknown.

The balance for air resistance testing can be entirely arranged in a recess of the wind tunnel for measuring the air resistance acting on the upper plate (i.e. the frictional force on the upper surface of the upper plate).

Each dual-hole beam sensor can obtain the value of the frictional force F on the upper surface of the upper plate. Optionally, for measurement accuracy, it may, for example, take the average of the frictional forces F on the upper surface of the upper plate obtained by the 4 dual-hole beam sensors as the measurement result.

The balance for air resistance testing of the present disclosure solves the problem of the interference of the force in z direction on the strain during the testing of the balance and the problem that the moment of the differential pressure force at the end walls is unknown, thereby directly measures the force in the flow direction and improves the measurement accuracy.

It should be understood by those skilled in the art that the above-mentioned embodiments are only for clearly describing the present disclosure rather than limiting the scope of the present disclosure. For those skilled in the art, other changes or modifications can be made on the basis of the above disclosure, and these changes or modifications are still within the scope of the present disclosure.

What is claimed is:

1. A balance for air resistance testing, characterized in that, it comprises: dual-hole beam sensors and an upper plate, wherein
   the dual-hole beam sensors are arranged beneath the upper plate and fixed to the upper plate;
   the dual-hole beam sensor comprises a beam, an upper hole and a lower hole, wherein the upper hole and the lower hole are arranged along the longitudinal direction of the beam, the upper hole is arranged at the upper part of the beam, and the lower hole is arranged at the lower part of the beam;
   the dual-hole beam sensor further comprises a first strain gauge, a second strain gauge, a third strain gauge and a fourth strain gauge, wherein the first strain gauge and the third strain gauge are arranged on the outer side of the lower part of the beam, and the first strain gauge and the third strain gauge are arranged symmetrically with respect to the lower hole; the second strain gauge and the fourth strain gauge are arranged on the outer side of the upper part of the beam, and the second strain gauge and the fourth gauge are arranged symmetrically with respect to the upper hole;
   the balance for air resistance testing comprises 2N said dual-hole beam sensors, wherein N is equal to 2;
   the upper plate is a rectangular plate, and the 2N dual-hole beam sensors are arranged respectively at the positions adjacent to the four angles of the rectangular plate.

2. The balance for air resistance testing according to claim 1, characterized in that, the beam has a cuboid shape.

3. The balance for air resistance testing according to claim 1, characterized in that, the upper hole and the lower hole are both circular holes.

4. The balance for air resistance testing according to claim 1, characterized in that, the upper hole and the lower hole of the dual-hole beam sensor are connected through along the longitudinal direction of the beam.

5. The balance for air resistance testing according to claim 1, characterized in that, the upper end of the beam is fixed to the upper plate.

6. The balance for air resistance testing according to claim 1, characterized in that, the balance for air resistance testing further comprises a lower plate for fixing the lower part of the beam of the dual-hole beam sensors.

7. A method for measuring the frictional force on the upper surface of the upper plate by using the balance for air resistance testing according to claim 1, characterized in that, the method comprises the following steps,
1) analyzing original forces acting on the upper plate, wherein the original forces acting on the upper plate are a tangential frictional force $F_\tau$, a differential pressure force $F(z)_{\Delta p}$ with unknown force arm and a force in the z direction $F_p$;
2) simplifying the original forces acting on the upper plate in the Step 1), wherein the resultant force acting on the upper plate in the flow direction is translated to the bottom of the upper plate, such that the original forces are simplified as: a force F formed by the resultant force acting on the upper plate in the flow direction after being translated to the bottom of the upper plate, a moment M caused by the translation of the force, and a gravity G in the z direction;
3) for each said dual-hole beam sensor, reading strain thereof is $\varepsilon_d = \varepsilon_1 - \varepsilon_2 - \varepsilon_3 + \varepsilon_4$, wherein $\varepsilon_1 \sim \varepsilon_4$ are the values of the strains of the first strain gauge, the second strain gauge, the third strain gauge and the fourth strain gauge respectively, and the values of the strains of the first strain gauge, the second strain gauge, the third strain gauge and the fourth strain gauge are:

$$\varepsilon_1 = \frac{FL_2 + M}{EW} - \varepsilon_G$$

$$\varepsilon_2 = \frac{FL_1 + M}{EW} - \varepsilon_G$$

$$\varepsilon_3 = -\frac{FL_2 + M}{EW} - \varepsilon_G$$

$$\varepsilon_4 = -\frac{FL_1 + M}{EW} - \varepsilon_G$$

wherein E is the Young modulus of the dual-hole beam, W is the section modulus in bending of the dual-hole beam, $\varepsilon_G$ is the strain generated by the gravity G at the strain gauges, $L_1$ is the distance from the bottom of the upper plate to the center of the upper hole of the dual-hole beam, and $L_2$ is the distance from the bottom of the upper plate to the center of the lower hole of the dual-hole beam;
4) the reading strain of each said dual-hole beam sensor is $$\varepsilon_d = 2\frac{F(L_2 - L_1)}{EW},$$

and the frictional force F acting on the upper surface of the upper plate is obtained according to the reading strain $\varepsilon_d$.

8. The method according to claim 7, characterized in that, when the balance for air resistance testing comprises more than one said dual-hole beam sensors, the value of the frictional force F acting on the upper surface of the upper plate is the average of the value of the frictional force obtained by each said dual-hole beam sensor.

* * * * *